(12) United States Patent
Andelman

(10) Patent No.: US 6,778,378 B1
(45) Date of Patent: Aug. 17, 2004

(54) FLOW-THROUGH CAPACITOR AND METHOD

(75) Inventor: Marc D. Andelman, Worcester, MA (US)

(73) Assignee: Biosource, Inc., Worcester, MA (US)

( * ) Notice: Subject to any disclaimer, the term of this patent is extended or adjusted under 35 U.S.C. 154(b) by 295 days.

(21) Appl. No.: 10/048,632

(22) PCT Filed: Jul. 29, 2000

(86) PCT No.: PCT/US00/20767
§ 371 (c)(1),
(2), (4) Date: Jan. 30, 2002

(87) PCT Pub. No.: WO01/09907
PCT Pub. Date: Feb. 8, 2001

Related U.S. Application Data

(60) Provisional application No. 60/146,397, filed on Jul. 30, 1999.

(51) Int. Cl.$^7$ .................................................. H01G 4/35
(52) U.S. Cl. ...................... 361/302; 361/307; 361/503; 361/517; 361/530; 361/532
(58) Field of Search ................................. 361/302, 303, 361/305, 306.1, 328, 511, 512, 519, 537, 541, 528, 530, 535, 540

(56) References Cited

U.S. PATENT DOCUMENTS

| | | |
|---|---|---|
| 3,658,674 A | 4/1972 | Benak |
| 3,930,094 A | 12/1975 | Sampson et al. |
| 5,192,432 A | 3/1993 | Andelman |
| 5,196,115 A | 3/1993 | Andelman |
| 5,200,068 A | 4/1993 | Andelman |
| 5,343,156 A | 8/1994 | Johnson et al. |
| 5,360,540 A | 11/1994 | Andelman |
| 5,415,768 A | 5/1995 | Andelman |
| 5,425,858 A | 6/1995 | Farmer |
| 5,538,611 A * | 7/1996 | Otowa |
| 5,547,581 A | 8/1996 | Andelman |
| 5,620,597 A | 4/1997 | Andelman |
| 5,656,915 A | 8/1997 | Eaves |
| 5,748,437 A * | 5/1998 | Andelman |
| 5,779,891 A | 7/1998 | Andelman |
| 5,793,603 A | 8/1998 | Lyman |
| 6,214,204 B1 | 4/2001 | Gadkaree et al. |
| 6,325,907 B1 * | 12/2001 | Andelman |
| 6,413,409 B1 * | 7/2002 | Otowa et al. |

* cited by examiner

Primary Examiner—Dean A. Reichard
Assistant Examiner—Nguyen T. Ha
(74) Attorney, Agent, or Firm—Leslie Meyer-Leon, Esq.; IP Legal Strategies Group P.C.

(57) ABSTRACT

A flow-through capacitor and method for the purification of fluids, like soft water. The capacitor includes anode-cathode electrodes (3) composed of a low surface area electrode material having a surface area between 10 to 1000 square meter per gram BET (Brunauer Emmett Teller method) to form one or more cells.

19 Claims, 2 Drawing Sheets

FLOW-THROUGH CAPACITOR AND METHOD

REFERENCE TO PRIOR APPLICATION

This application is the national stage of PCT/US00/20767, filed Jul. 29, 2000, which is a based on and claims priority from U.S. Provisional Patent Application Serial No. 60/146,397, filed on Jul. 30, 1999, and are hereby incorporated by reference.

BACKGROUND OF THE INVENTION

Flow-through capacitors utilizing high surface area electrodes have proven commercially useful for water purification and are well-represented in patents, for example, Andelman U.S. Pat. Nos. 5,192,432, issued Mar. 9, 1993; 5,196,115; issued Mar. 23, 1993; 5,200,068, issued Apr. 6, 1993; 5,360,540; issued Nov. 1, 1994; 5,415,768; issued May 16, 1995; 5,547,581; issued Aug. 20, 1996; 5,620,597; issued Apr. 15, 1997; 5,748,437; issued May 5, 1998; 5,779,891; issued Jul. 14, 1998; Otowa U.S. Pat. No. 5,538,611, issued Jul. 23, 1996; Farmer U.S. Pat. No. 5,425,858, issued Jun. 20, 1995; and Benak U.S. Pat. No. 3,658,674, issued Apr. 25, 1972, which all describe the use of high surface area materials. These materials are often of a high surface area formed of carbon, including active powdered carbon, active carbon cloth, and aerogel. For example, Otowa U.S. Pat. No. 5,538,611 claims the use of active carbon with surface areas generally greater than about 1000 B.E.T. (see column 6, lines 29–33), and Andelman U.S. Pat. No. 5,620,597 describes the use of 2000 square meters per gram active carbon in a flow-through capacitor (see column 14, lines 8–10), and U.S. Pat. No. 5,620,597 describes flow-through capacitor electrodes made from virtually any corrosion-resistant, high surface area material (see column 4, line 51 to column 5, line 16). U.S. Pat. Nos. 5,196,115; 5,192,432, 5,200,068 all describe the use of high surface area materials. U.S. Pat. No. 5,547,581 states high surface area materials greater than about 1000 square meters per gram (see column 14, line 7). U.S. Pat. No. 5,425,858 specifies the use of a high specific surface area aerogel in flow-through capacitor construction (see column 5, lines 66–69) and describes the use of exceptionally high, specific surface area aerogel electrodes, for example, 400 to 1000 square meters per gram (see column 5, line 66 to column 6, line 1).

There are also many examples of flow-through capacitors utilizing low surface area, yet high resistance electrodes. This may be either due to the use of intrinsically nonconductive materials or due to the incorporation of enough nonconductive inert materials or binders to adversely affect bulk conductivity properties. For example, the publication by Danny D. Caudel et al, entitled *Electrochemical Demineralization of Water with Carbon Electrodes*, U.S. Department of the Interior Research and Development Progress Report No. 188, May 1966, describes the use of flow-through capacitors with carbon electrodes. Table III from this publication describes demineralization as a function of surface area. This work generally describes the use of carbon black electrodes calendared into backing materials, which add considerable nonconductive material to the electrode, and therefore, impart a high degree of resistance. All of the carbons used were of low surface area, i.e., below 1000 square meters per gram but were combined with inert high resistance material. All anode-cathode pairs listed contained at least one with a low surface area material, i.e., below 310 square meters per gram.

However, the through resistance that is listed in Tables I through III is high, i.e., over 0.5 ohms, and generally, over 1 ohm. Even though the Caudle publication uses highly conductive carbon blacks and graphite in the electrodes, the fabricated electrodes have a high resistance, due to the large amount of inert binder material used to fabricate a monolithic electrode from powdered conductive carbon black materials, for example, Caudle describes the use of a calendared DACRON® (a registered trademark of E.I. du Pont de Nemours and Company of Wilmington, Del.) combined with the conductive carbon blacks (see page 66).

SUMMARY OF THE INVENTION

The invention relates to flow-through capacitors, electrodes employed in such capacitors, and a method of fabricating and operating the flow-through capacitors.

The invention relates to a flow-through capacitor for the purification of a fluid, which capacitor comprises: a housing; an inlet in the housing for the introduction of a fluid to be purified; and an outlet in the housing for the withdrawal of a purified fluid. The invention also comprises a plurality of anode-cathode electrode layers composed of electrode material to form one or more cells for the purification of the fluid. These layers are arranged and constructed to provide for the flow of the fluid between the layers and through the cells; with a capacitor having a series resistance per individual cell of about 0.03 ohms or less; and an electrode material having a surface area of between about 10 and 1000 square meters per gram B.E.T. (Brunauer Emmett Teller method) and having a capacitance of above about 1 farad per gram capacitance.

One object of the invention is to take advantage of low electrical resistance, low surface area, high capacitance materials in order to provide flow-through capacitors with improved flow rates, better energy efficiency and more corrosion resistance.

An additional object of the invention is to provide flow-through capacitors with low surface area and highly conductive materials with a series resistance of less than about 0.3 ohms.

High resistance limits the amount of electric current that can flow into a capacitor. By limiting the electric current, high resistance also limits the flow rate of water that may be purified in a flow-through capacitor. Low resistance allows a more energy efficient, flow-through capacitor, with a faster flow rate per gram utilization of capacitor material. The flow rate which is required in order to achieve 90 percent purification should be above 1 ml per minute per gram of low surface area material, preferably, above 4 ml per minute per gram low surface area material. This should apply across a broad range of concentrations, up to at least 0.02 N. Many low surface area materials are intrinsically conductive, so they do not require current collectors or compression contacts to their current collectors, thereby eliminating an element of resistance.

The high surface area materials of the prior art are used because of the increased capacitance intrinsic to these materials. The high surface area materials of the prior art need to be highly porous or highly textured, which lowers the bulk conductivity of these materials. However, high porosity intrinsic to high surface area materials increases bulk resistivity. Therefore, flow rate and energy efficiency, per given amount of material, is also decreased. Flow-through capacitors made from high surface area materials generally require higher operating voltages to compensate for voltage drops, due to the high resistance of these materials. This stresses the materials and decreases electrode life, due to oxidation or corrosion of the high surface area materials. Generally, while low surface area materials may also be useful when operated at over one volt, low surface area materials charge faster and can utilize higher amps per gram of material, and therefore, allow operation of the flow-through capacitor.

Therefore, since there is less resistance-caused voltage drop during the charge cycle, the average measured operating voltage in the capacitor itself, as opposed to the power supply terminals, will be lower. For example, a power supply terminal may supply 2 volts, but the voltage experienced inside the capacitor itself, as averaged during charging period, may optimally be less than 1 volt. The remaining voltage drop is in the wire leads to the capacitor and is not available to oxidize or adversely affect the surface area electrode materials. The low average operating charge cycle voltage, thus provided, increases electrode life, due to decreased oxidation and corrosion. Low average operating cycle voltage of the invention also allows better energy usage.

Where corrosion is not a concern, the low resistance, low surface area materials are also able to operate under more amps, or power, and therefore, charge faster and offer a faster flow rate purification, of about above 1 ml per minute per gram, and preferably about 4 ml per minute of electrode material for 90 percent purification, when increased flow rate is required, and it is desirable to operate the flow-through capacitor at more than 50 milliamps per gram of electrode material.

High surface area, high resistance capacitors of the prior art that are slower to charge, with slower flow rate purification per given weight or volume of electrode material, need to be run at higher, less energy efficient voltages in order to compensate for the high resistance materials. Therefore, a need exists for lowered surface area, lowered resistance, yet high specific capacitance, flow-through capacitors.

In order to take advantage of the increased performance of improved electrical efficiency, a need exists for a low resistance, flow-through capacitor. Generally, lower surface area materials, unless combined with large amounts of nonconductive material, have higher conductivity, due to their decreased porosity and greater bulk density. Fortunately, however, due to their better electrical conductivity, more of that surface area is available for use as capacitance in low resistance materials. Therefore, lower surface area materials may be utilized without sacrificing capacitance, while increasing flow rate, energy efficiency, and performance, due to lower resistance.

The invention allows the use of lower, specific surface area aerogels in order to take advantage of the increased electrical conductivity inherit in low surface area, less porous materials. For example, activated carbon powder; activated carbon cloths; carbon blacks; aerogels; foamed, glassy carbon; porous or textured graphite; and other active carbon materials with specific surface areas of less than 400 square meters per gram may be used as flow-through capacitor electrodes, in order to take advantage of the higher electrical conductivity of these lower surface area materials. Surface area should not be below about 10 square meters per gram; however, in order to provide high specific capacitance. Using denser, lower surface area materials provide enhanced bulk conductivity, hence higher performance.

Platinum series blacks and conductive oxides make particularly nice electrodes, due to low resistance and high capacitance, despite low surface area. Ruthenium oxides; titanium oxides; and other transition metal oxides; nitrides, borides; and carbides; or combinations thereof are preferred embodiments. Magneli phase titanium suboxide is a particularly conductive material, as is $TiNO_2n-1$, where (n) is a whole number between 4 and 10. Low surface area ceramic electrodes, both as sintered monoliths and as powders, are held together with a binder, including a polytetrafluoroethylene (PTFE) binder.

Conductive oxides are also electrochemically rugged and resistant to corrosion and oxidation when used in bipolar electrode stacks. Electrochemically inert materials and conductive ceramics, in general, may be used either in particle; fiber; sintered; sheet; or monolithic form. These materials also have highly beneficial low resistance, relative to the high resistance materials described in the aforementioned prior art patents.

In general, it is preferable that surface areas of low surface area conductive electrodes be less than 400 square meters per gram, but not less than 10 square meters per gram. It is not desirable that surface areas be too low, or specific capacitance will be compromised, e.g., simple sintered powered metals have too low a surface area. Conductive electrode materials should have enough surface area to have high specific capacitance, preferably over 1 farad per gram. Surface areas between 10 square meters per gram and 400 square meters per gram allow an optimization of high specific capacitance and high electrical conductivity. Porosity and texturing commensurate with this amount of surface area is desirable. Dense, low surface area materials between 10 and 400 square meters per gram and with densities of 0.1 grams per cubic centimeter or higher provide a high volumetric capacitance or high capacitance per cubic centimeter.

Generally, any corrosion-resistant, high conductivity material with surface areas between 10 and 400 square meters per gram combined with high specific capacitance may be used. Such capacitances may typically be above 1 farad per gram or above 1 farad per cubic centimeter of capacitor volume. Preferably, such capacitances will be above 10 farads per gram or 10 farads per cubic centimeter. Resistances may typically be less than 0.03 ohm-cm, preferably less than 0.01 ohm-cm. Some highly conductive materials with resistance of less than 0.03 ohm-cm may have a slightly higher surface area than 400 square meters per gram, e.g., up to 1000 square meters per gram. For example, aligned nanotubes or nanotube electrodes generally may be in the 100 to 1000 square meters per gram range, yet have higher conductivity and higher capacitance than the active carbon, aerogel, or carbon cloth of the prior art. Resistance of nanotube materials is 0.001 ohm-cm or less. Some highly conductive carbon blacks, such as Monarch 1400, with surface area in the 560 square meters per gram range, have capacitance comparable to prior art materials, yet a resistance of less than 0.01 ohm-cm, which is lower than prior art surface area carbon materials, such as aerogel, active carbon, and carbon cloth.

Therefore, capacitors made from relatively low surface area carbon blacks and nanotubes below 1000 square meters per gram offer a more energy efficient, flow-through capacitor with faster purification flow rate per given size of capacitor equipment or system.

Surprisingly, even though the surface areas are less compared to prior art high resistance, high surface area materials, capacitance of the lower surface area materials is high. This is due to the better utilization of the surface area in a low surface area, more conductive material. Therefore, low surface area, low resistance materials are useful to provide an improved performance, flow-though capacitor.

Titanium foil and ruthenium oxide materials offer an improved, flow-through capacitor with lower series resistance and faster flow rate purification per given amount of electrode material. These materials may be used alone; in mixtures; coated onto substrates; or coated onto current collectors. For example, oxides of ruthenium may be plated, sintered, or coated onto current collecting substrates, including tantalum, titanium and graphite. Alternatively, powdered forms of these materials may be formed into sheets by sintering or by employing a polymeric binder, including fibrillated PTFE. U.S. Pat. No. 4,153,661 describes the use of PTFE with powder materials in order to make thin sheet materials. Conductive blacks or porous preparations of graphite with surface areas between 10 square meters per gram and 400 square meters per gram may be used. The amount of binder in PTFE electrodes is less than 10 percent, typically, less than 6 percent, so the binder holds the conductive powder electrode materials together into an electrode sheet, without significantly affecting the bulk conductivity.

The electrode sheet may be used as is or with conductive foil; a polymer; graphite foil; metal; or other conductive current collector. Preparations of nanotubes between 10 and 400 square meters per gram, including aligned nanotubes, may be used. The current collector and electrodes may be in sheet; wire; or rod form; or any geometry, which allows for facing anode-cathode pairs separated by a spacer. The spacer may be any material that is ionically conductive, yet electrically insulating. For example, the spacer may consist of insulating microprotrusions, screen printed insulators, or may be separate sheet materials, for example, nonwoven polyolefin; woven or nonwoven polymeric netting material; NAFION® (a registered trademark of E.I. du Pont de Nemours and Company of Wilmington, Del.); ceramics fiberglass; mineral particles, etc. Alternatively, the electrodes may be spaced apart with gaskets or supports built into the cartridge holder, as long as the electrodes are low surface area, low resistance. Generally, a surface area between 400 square meters per gram and 10 square meters per gram will offer sufficiently low resistance electrodes for improved performance, flow-through capacitors, for example, below 1 ohm-cm, preferably, below 0.03 ohm-cm. Such electrodes should have a minimum amount of surface area in order to provide high specific capacitance, for example, vitreous carbons, foams, and porous metal electrodes made from powder metallurgy. However, unless these materials have a minimum surface area, preferably, over ten square meters per gram, the electrodes will be of low specific capacitance, and therefore, less useful for fabrication into flow-through capacitors, due to decreased ion adsorption ability. If the surface area is too high, resistance increases. Surface area of sintered powdered metals should be between 10 square meters per gram and 400 square meters per gram.

The ability of low surface area, low resistance materials with average operating voltage enables connection, the internal to the cartridge holder, of flow-through capacitor electrodes in series, since the improved conductivity and lower average operating voltage allow a lower resistive voltage drop from the power supply to the conductive leads, the optional current collectors, and the capacitor electrodes themselves. This voltage drop is preferably less than 4 volts. Low voltage of drop allows series connection internal to the cartridge holder, without exceeding the potential where electrolysis occurs. Each anode and cathode pair becomes an individual capacitor.

The voltage of the electrode stack itself, less losses in the conductive leads, is preferably less than the breakdown voltage of water, plus overpotential of the electrodes. This is preferably 2 volts or less for aqueous solutions and 4 volts or less for organic solutions. The actual voltage of each individual capacitor within the stack is the stack voltage divided by the number of electrode pair layers. Each electrode pair represents a capacitor in series.

Connection of electrodes in series provides improved energy efficiency by utilizing higher voltage power for a given amperage. The entire stack has the same voltage as the parallel-connected capacitors. However, this stack is made from the number (n) of multiple internal capacitors connected in series. These each have their voltage reduced by the number (n). Therefore, the electrodes experience a 1/n lowered, average operating voltage compared to parallel-connected capacitors, thereby exhibiting better corrosion resistance; lower amperage requirements; better energy utilization; and ability to utilize less expensive, lower amperage power. Without the use of low resistance, low surface area materials, electrical resistance is too large to make this practical.

The invention will be described for the purpose of illustration only in connection with certain illustrated embodiments; however, it is recognized that various changes, modifications, additions, and improvements may be made in the illustrative embodiments without departing from the spirit or scope of the invention.

DESCRIPTION OF THE EMBODIMENTS

Figure 1:
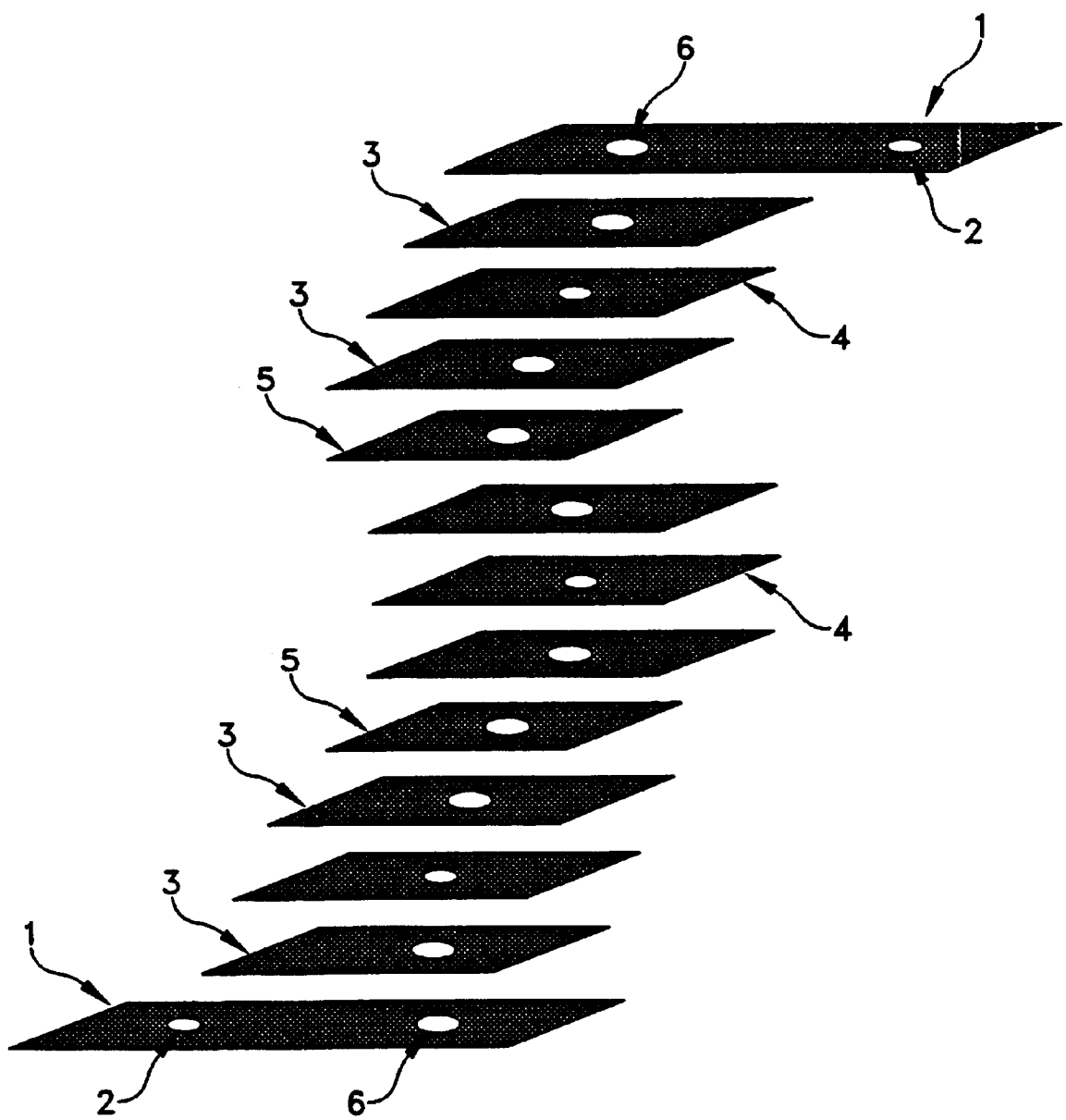
FIG. 1 is a schematic, exploded view of a multilayer electrode for use in a series-connected capacitor.

FIG. 1 shows the arrangement of electrode layers used to construct a series-connected, flow-through capacitor. In this example, only the end electrodes 1 are actually used to connect to the power supply. Hole 2 is provided so that the threaded rod 9 and washer-screw means 11 shown in FIG. 2 may be attached in order to form a compression contact with the conductive lead and with bolt 10. Layers 3 are the low surface area, high conductivity electrodes, with optional internal current collectors 5, and end series-connectable current collectors 1, with the FIG. 1 lead connector hole 2. Highly conductive, low surface area electrodes may omit the end current collectors 1 and 5 and function as their own current collector, in which case, the series-connectable, low surface area electrodes are extended and provided with a connecting means, such as hole 2. Alternatively, some materials may be welded, crimped, or drawn out to form a lead, such as a wire lead. The number of layers may be any integral number, but preferably, less than 1000. The series-parallel combination is also possible. For example, the layers shown in FIG. 1 may be repeated many times, with the extending lead-containing electrodes connected in parallel and the internal, nonextending electrodes connected in series. Connection in series means connected in the electronic sense. There is no actual connection between the internal electrodes, since these are separated by spacers 4.

Figure 2:
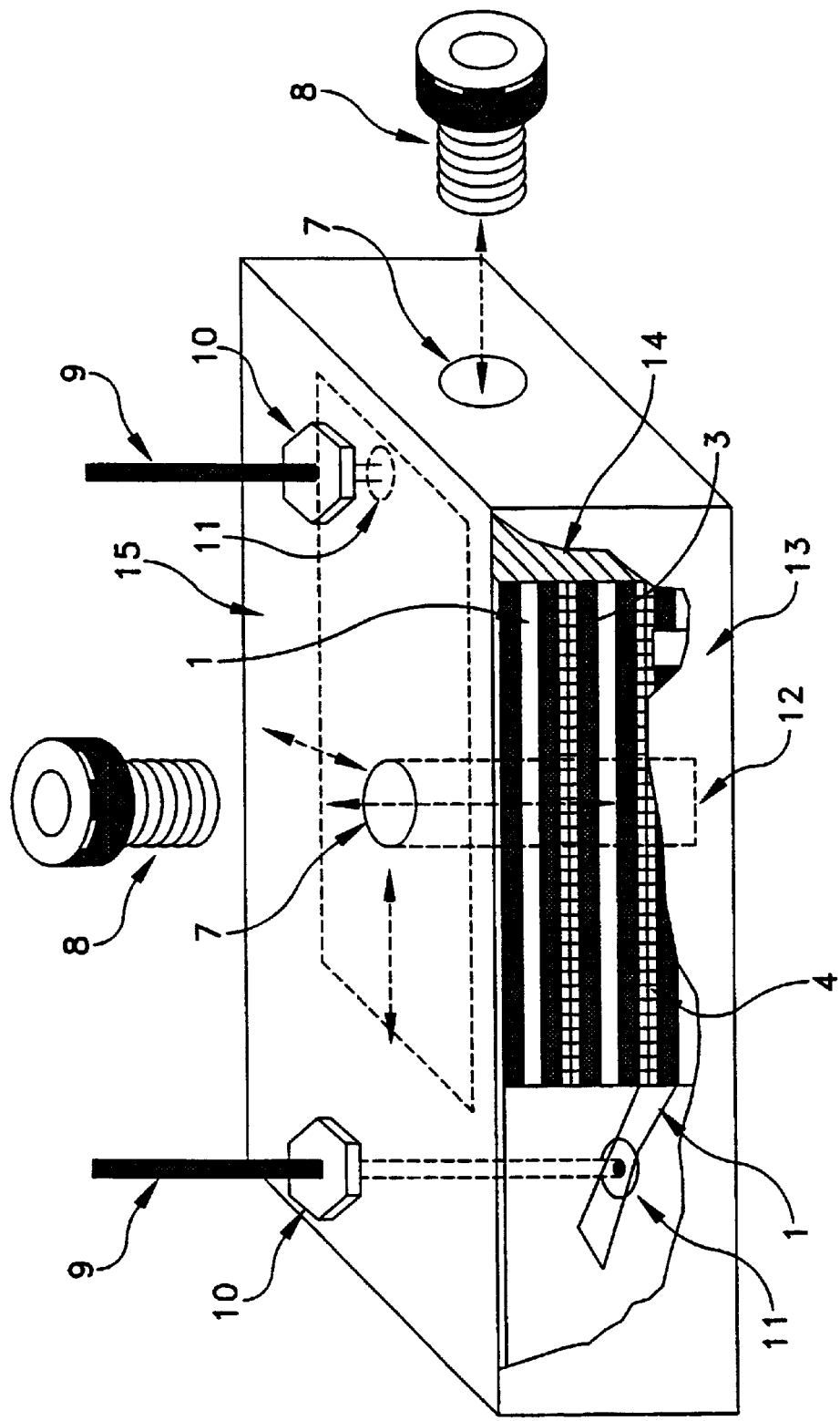
FIG. 2 illustrates a flow-through, series-connected, capacitor of the invention.

FIG. 2 shows an assembled series means 9, bolt means 10, and washer-screw means 11, which form a compression electrical contact to end electrode 1. The conductive lead 1 may be compressed between the top plate 15 with bolt 10, to form the compression contact with washer-screw assembly 11. The entire electrode stack 14 is placed inside cartridge holder 13 with inlets and outlets 7 and fluid-connecting fixtures 8. Arrows demonstrate the flow path, which flows into either the top or the side. For example, flow from the side surrounds the electrode stack 14, flows between the layers 3, either through the electrode material, if porous, or through the flow channel formed by the spacer, and thence out the top through the internal flow path 12 formed by alignment of the internal electrode, spacer, or current collector holes 6 shown in FIG. 1.

Any flow-through capacitor geometry may be converted to series-connected, flow-through capacitor by not physically connecting the internal electrodes. For example, spiral wound versions of series-connected, flow-through capacitors may be made by supplying multiple anode-cathode layers, but only extending and connecting a lead from the end electrodes. The stacked disk design of FIG. 1 of Andelman U.S. Pat. No. 5,779,891 may be used by connecting to the power source only to the end electrode and the simple elimination of the middle parallel connecting leads 4. FIG. 12 of Andelman U.S. Pat. No. 5,779,891 shows an unusual geometry of multiple rod-type electrodes, all connected in parallel. To connect these in series, separated rows of rods may be connected to opposite poles of a power supply, with an intervening even number of at least two rows of rods that have no physical connection to the power supply. The internal, disconnected rods form the anode-cathode pairs, which serve as individual series capacitors.

The flow-through capacitor of the invention may be employed to purify water, wastewater, or cooling tower water.

In addition, the flow-through capacitor of the invention is useful in treating or removing ionic contaminants from chemical process streams, including, but not limited to: caprolactam; ethylene glycol; sugar; and corn syrups. The flow-through capacitor of the invention may be used to absorb electrostatically ionic compounds, electrocatalytically decompose organic molecules, or electrochemically react with or plate metal solutions. The flow-through capacitor of the invention may also be useful in electrochemical synthesis.

EXAMPLE 1

$RuO_2 xH_2O$ powder material with a surface area in the range of 40 to 400 square meters in a sheet of 0.01 inches thick, with a fluorocarbon, like fibrillated PTFE, is made into the flow-through capacitor of FIG. 1. NALTEX® (a registered trademark of Nalle Plastics, Inc. of Austin, Tex.) biplanar filtration netting is used for the spacer, and graphite foil, titanium, or another uncorrodable material is used for the optional current collector. Brackish water containing 0.1 M NaCl is purified 90 percent to 0.01 M, at a flow rate of better than 4 milliliters per minute per gram of electrode material.

EXAMPLE 2

$RuO_2$, plated as a thin, less than 0.005 inch thick layer upon 0.005 inch tantalum foil, to create a composite electrode with an intrinsic current collector that has a B.E.T. surface area in the 400 to 200 square meter per gram range and resistance of less than 0.001 ohm-cm is cut into 3 inch squares and assembled into a spiral wound, flow-through capacitor. A DC power supply provides 1.2 volts to the flow-through capacitor, while contaminated feed water is pumped into the capacitor from a ground water source.

Water containing radioactive strontium and cesium is purified to better than 90 percent and pumped back into the ground. Concentrated radioactive wastewater is desorbed from the capacitor and fed into a crystallizer unit for further concentration.

EXAMPLE 3

Molybdenum nitride, boride, and carbide films deposited on 0.5 mil thick titanium foil, as described in Andelman U.S. Pat. No. 5,680,292, are made into a series flow-through capacitor shown in FIG. 2. A DC power supply provides 2 volts across the entire stack. This is incorporated into the controlled system shown in FIG. 15 of Andelman U.S. Pat. No. 5,620,597, in order to provide a smaller, flow-through capacitor that purified 500 ppm dissolved solids water at the accelerated volumetric flow rate of 3 ml per minute per cubic centimeter of capacitor cartridge size.

EXAMPLE 4

Monarch1400™, a hydrophilic conductive black from the Cabot corporation, with a nitrogen surface area of 560 square meters per gram is formed into 0.02 inch thick sheet material with 5 percent PTFE binder, in order to make composite electrodes that are less than 0.02 to 0.01 ohm-cm. Graphite foil of 0.05 inches thick is used as conductive backing. The 0.02 inch NALTEX® biplanar filtration netting with 1 mm wide mesh is used for a spacer. This is fabricated into a flow-through capacitor as described in FIG. 1. A DC power supply is connected to the parallel, bundled-together anode and cathode leads and powers the capacitor at constant voltage of 1 volt.

Polarity is reversed every charge cycle. A 2000 microSiemen solution of municipal water is purified to better than 70 percent. Once conduction reaches 600 microSiemens, a relay shunts a three-way valve to waste, while simultaneously, the capacitor is short circuited. This desorbs the absorbed contaminants, which are flushed down the drain. The capacitor polarity is reversed for the next charge/purification cycle. A sand prefilter is used to remove particulates. A cloth post filter is used in order to catch coagulated organics and other particulates that might otherwise desorb from the capacitor and flow into the product stream. An optional deionization resin or reverse osmosis system polishes the product water from the capacitor. The flow-through capacitor of the invention may also be used in the feed, recycle, or wastewater loop of a RO deionization electrodialysis or filtration system.

EXAMPLE 5

The flow-through capacitor of Example 4 is used to absorb halogenated hydrocarbons at zero volts. The capacitor is then run for five minutes, at 2 volts, in order to electrocatalytically degrade the absorbed halogenated hydrocarbons.

EXAMPLE 6

The flow-through capacitor of Example 2 is run at 2 volts in the presence of chlorides, in order to generate chlorine and other redox compounds for the purpose of sterilization of microbes in water.

EXAMPLE 7

Ten capacitors of Example 4 are connected electrically in series in order to allow the use of higher voltage, lower amperage power. Voltage dividing means are provided to the DC power supply. Each cell is individually monitored and controlled, in order to provide an equal voltage to each cell.

What is claimed is:

1. A flow-through capacitor comprising:
   a) a housing comprising an inlet for the introduction of a fluid and an outlet for the withdrawal of a fluid; and b) a plurality of anode-cathode electrode layers to form a cell within the housing, the electrode layers comprising an electrode material having a capacitance of above about 1 farad per gram capacitance, the layers arranged and constructed to provide for the flow of the fluid between the layers and through the cell;

wherein the flow-through capacitor has a series resistance per individual cell of about 0.03 ohms or less.

2. The flow-through capacitor of claim 1, wherein the electrode material has a surface area of between about 10 and 1000 square meters per gram BET (Brunauer Emmett Teller method).

3. The flow-through capacitor of claim 1, wherein the electrode material has a surface area of between about 100 to 1000 square meters per gram BET (Brunauer Emmett Teller method).

4. The flow-through capacitor of claim 1, wherein the electrode material has an electrical resistance of 0.01 ohms-cm or less and a capacitance of above 10 farads per gram.

5. The flow-through capacitor of claim 1, wherein the electrode material is selected from the group consisting of carbon black, aerogel, activated carbon, carbon cloth, or combinations thereof.

6. The flow-through capacitor of claim 1, wherein the electrode material has a surface area of between about 10 and 400 square meters per gram BET (Brunauer Emmett Teller method).

7. The flow-through capacitor of claim 1, wherein the flow-through capacitor is in electrical contact with an electrical power supply, and the resistive voltage drop from the power supply to the capacitor to less than about 4 volts.

8. The flow-through capacitor of claim 1, whereby the anode-cathode electrodes are electrically connected in series.

9. The flow-through capacitor of claim 1, wherein the capacitor comprises a plurality (n) of cells.

10. The flow-through capacitor of claim 9, wherein at least a portion of the plurality (n) of individual cells is connected in series, and the operating voltage of the individual cells is 1/n of the voltage of the entire series.

11. The flow-through capacitor of claim 1, further comprising means for measuring the voltage of an individual cell.

12. The flow-through capacitor of claim 1, wherein the capacitor is characterized by a fluid flow rate of greater than about 1 milliliter per minute per gram (1 ml/minute/gm) of electrode material.

13. The flow-through capacitor of claim 1, wherein the electrode material is selected from the group consisting of ruthenium oxide and a fibrillated fluorocarbon, ruthenium oxide coated on titanium, tantalum and graphite material, and combinations thereof.

14. The flow-through capacitor of claim 1, which comprises a compressed stack of electrode layers.

15. The flow-through capacitor of claim 1, wherein said inlet fluid is a source of contaminated water, and said outlet fluid is substantially purified water.

16. The flow-through capacitor of claim 1, wherein the electrode layers are characterized by a generally central, flow-through fluid hole.

17. The flow-through capacitor of claim 1, wherein the electrode material has a density of 0.1 grams per cubic centimeter or higher.

18. A method for the purification of water containing ionic contaminants, which method comprises the steps of:
  a) providing the flow-through capacitor of claims
  b) introducing water to be purified into the inlet; and
  c) withdrawing substantially purified water from the outlet.

19. The method of claim 18, further comprising the steps of removing ionic contaminants from the capacitor.

* * * * *

UNITED STATES PATENT AND TRADEMARK OFFICE
CERTIFICATE OF CORRECTION

PATENT NO. : 6,778,378 B1 Page 1 of 1
APPLICATION NO. : 10/048632
DATED : August 17, 2004
INVENTOR(S) : Marc D. Andelman It is certified that error appears in the above-identified patent and that said Letters Patent is hereby corrected as shown below:

Column 10, line 29, claim 18, delete the word "claims" and insert --claim 1;--

Signed and Sealed this

Eighth Day of April, 2008

JON W. DUDAS
*Director of the United States Patent and Trademark Office*